United States Patent [19]

Weiman et al.

[11] Patent Number: 4,905,151
[45] Date of Patent: Feb. 27, 1990

[54] ONE DIMENSIONAL IMAGE VISUAL SYSTEM FOR A MOVING VEHICLE

[75] Inventors: Carl F. R. Weiman, Westport; John M. Evans, Jr., Brookfield, both of Conn.

[73] Assignee: Transitions Research Corporation, Danbury, Conn.

[21] Appl. No.: 165,015

[22] Filed: Mar. 7, 1988

[51] Int. Cl.$^4$ .............................................. G06F 15/50
[52] U.S. Cl. ................................ 364/424.02; 180/169; 180/167; 364/449
[58] Field of Search ............... 364/424.02, 443, 513, 364/456, 449; 180/167, 168, 169; 382/22

[56] References Cited

U.S. PATENT DOCUMENTS

| | | | |
|---|---|---|---|
| 3,610,754 | 10/1971 | Pirlet | 356/1 |
| 3,773,422 | 11/1973 | Stavis et al. | 353/383 |
| 4,028,533 | 6/1977 | Matsubara | 364/410 |
| 4,119,900 | 10/1978 | Kremnitz | 318/587 |
| 4,309,758 | 1/1982 | Halsall et al. | 364/424.02 |
| 4,482,960 | 11/1984 | Pryor | 364/424.02 |
| 4,500,970 | 2/1985 | Daemmer | 364/513 |
| 4,575,304 | 3/1986 | Nakagawa et al. | 414/730 |
| 4,620,285 | 10/1986 | Perdue | 364/513 |
| 4,623,032 | 11/1986 | Kemmer | 180/169 |
| 4,626,995 | 12/1986 | Lofgren et al. | 364/424 |
| 4,653,002 | 3/1987 | Barry | 364/424 |
| 4,658,385 | 4/1987 | Tsuji | 367/105 |
| 4,679,152 | 7/1987 | Perdue | 364/513 |
| 4,695,156 | 9/1987 | Taft | 356/1 |
| 4,698,775 | 10/1987 | Koch et al. | 364/478 |
| 4,710,020 | 12/1987 | Maddox et al. | 356/1 |
| 4,796,198 | 1/1989 | Boultinghouse et al. | 364/513 |
| 4,815,008 | 3/1989 | Kadonoff et al. | 364/513 |

OTHER PUBLICATIONS

A Journal Article Entitled, "Archie-An Experimental 3D Vision System" by R. J. Fryer Process of the Fourth International Conference on Robot Vision and Servo Controls, pp. 197-208.
An Article Entitled, "Epipolar-Plane Image Analysis: A Technique for Analyzing Motion Sequences", by Robert C. Bolles et al.
A journal article entitled "A Semi-Autonomous Remote Controlled Mobile Robot", by L. Maree, et al., The Industrial Robot, Dec., 1980.
A journal article entitled, "A Report on the State of the Art", by William B. Gevarter, reprinted from Computers in Mechanical Engineering, Apr., 1983, pp. 14–19.
A journal article entitled, "Visual Sensing and Interpretation: The Image Understanding Point of View", by Takeo Kanade, reprinted from Computers in Mechanical Engineering, Apr., 1983, pp. 3–13.

Primary Examiner—Parshotam S. Lall
Assistant Examiner—Thomas G. Black
Attorney, Agent, or Firm—Perman & Green

[57] ABSTRACT

A vision system for a mobile robot 10 comprises an optical sensor subsystem 20 which generates a substantially one dimensional image of an environment, a signal processing subsystem 24 for extracting and enhancing significant vertical visual features from the one dimensional image and a feature processing system 26 which analyses rapidly and in real time the extracted features for use by a control system 28 for navigation of the robot. The optical sensor may be a line scan camera having a plurality of outputs which relate to brightness values received from the environment. Triangulation, optical flow and optical flow with log transforms methods are disclosed for processing the one dimensional image data to yield azimuth and/or distance to an object within the environment. Also disclosed is a binocular vision system which generates two, one dimensional images and a method of processing same.

36 Claims, 4 Drawing Sheets

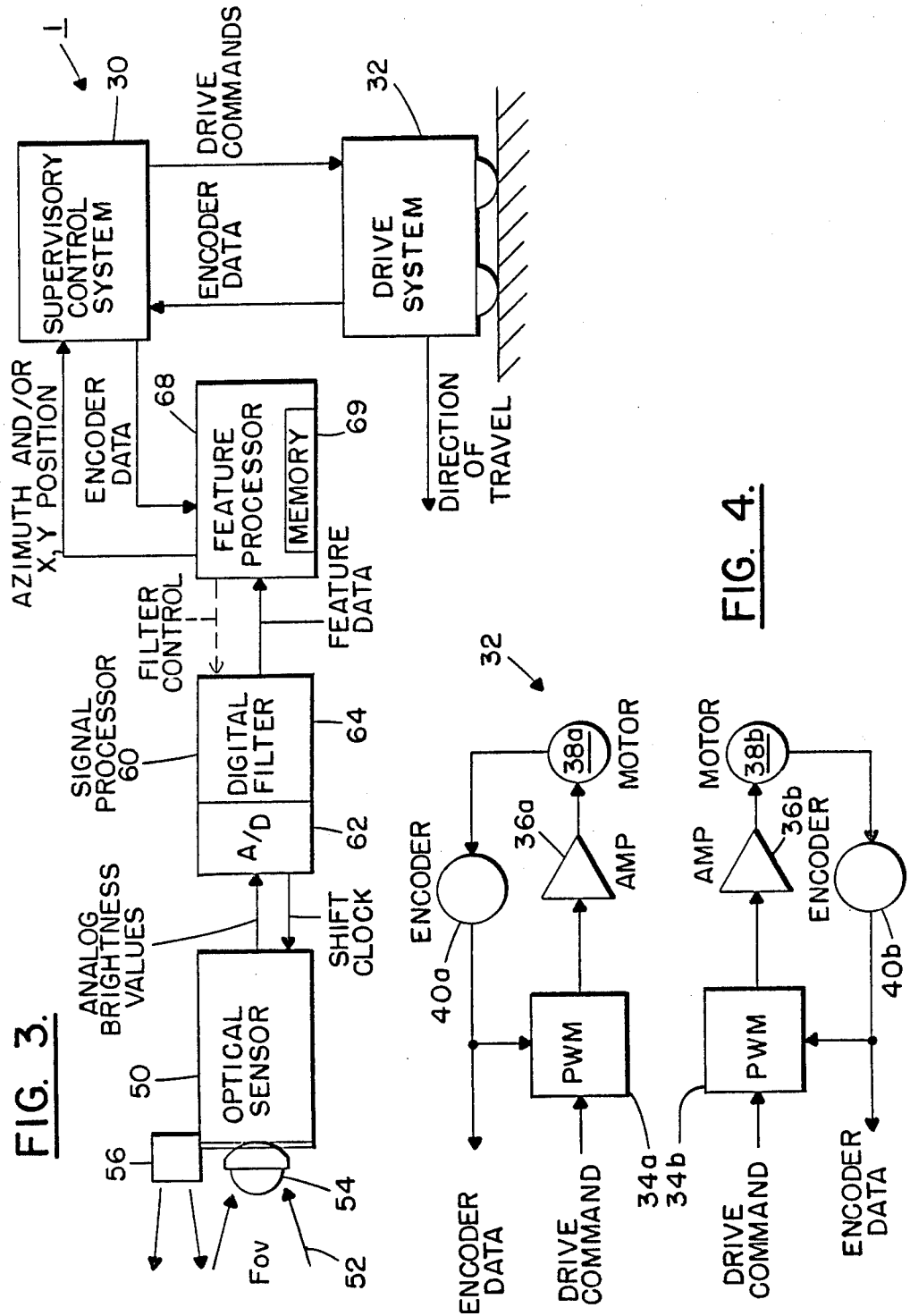

TRIANGULATION

OPTICAL FLOW PERSPECTIVE PROJECTION

OPTICAL FLOW WITH LOG TRANSFORMS

BINOCULAR

ONE DIMENSIONAL IMAGE VISUAL SYSTEM FOR A MOVING VEHICLE

FIELD OF THE INVENTION

This invention relates generally to vision systems and, in particular, relates to a vision system for a moving vehicle, such as a mobile robot, which comprises a one dimensional image optical sensor subsystem, a signal processing subsystem for extracting and enhancing visual features from the one dimensional image and a feature processing subsystem for extracting significant navigation information from the one dimensional processed image.

BACKGROUND OF THE INVENTION

In some mobile robots an important component is a vision system which detects features within the robot's environment and provides a navigation system with inputs related to the position and/or distance of the features relative to the robot's present position. These inputs are utilized by the navigation system to steer the robot such that a particular feature is avoided, in which case the feature may be considered to be an obstacle, or to steer the robot in order to direct the robot towards the feature. For example, if a first feature is an opening within a doorway it may be desirable to steer the robot such that the robot passes through the doorway while avoiding a second feature, such as a chair, disposed within the path of the robot.

One conventional type of robotic vision system employs the transmission of energy into the robot's environment and the subsequent detection of reflected energy. The energy may be acoustic or laser energy. For example, acoustic energy is reflected from features in the environment and is subsequently processed to determine the range and bearing to the features. It has been found however that such acoustic imaging systems are limited in the rate of transmission and also in wavelength and thus suffer from a corresponding limited feature resolution capability. Furthermore, many features exhibit differing acoustic reflection properties, thereby complicating the extraction of feature related signals from the reflected energy. Furthermore, laser transmitters may add significant cost, weight and power requirements to the system and may be inappropriate for many applications.

Another type of conventional robotic vision system employes a two dimensional array of electromagnetic radiation sensors, such as a vidicon or a CCD radiation sensor, in order to generate a two dimensional image of the environment. Such images generally are comprised of a plurality of image pixels, the number of which relates to the resolution of the visual system. Each pixel typically has a digital value associated therewith which relates to the amount of radiation received by a corresponding sensor, these values being known as a gray scale. For example, each pixel may have a byte value (8 bits) which corresponds to an intensity range between zero and 255. A number of image processing techniques are known for processing pixel gray scale values to enhance image features which may be significant for a given robotic task. These techniques include the Sobel and Laplacian Operators for feature edge detection, Gaussian Operators for image filtering and Fourier Transforms for characterizing image regularity and symmetry.

Such conventional two-dimensional vision systems generate ionic, or image, representations of the environment which are typically subsequently processed to derive a symbolic representation wherein environmental features are expressed as a list of features and the relative positional coordinates of the features. As can be appreciated, due to the large amount of data generated by a two dimensional imaging system this is a time consuming, computation intensive process.

Thus, a significant problem is introduced by such conventional two dimensional imaging systems and processing techniques when it is desired to provide a relatively small, low cost mobile robotic system which moves in a continuous and "real time" fashion. This problem is related to the speed, power consumption and complexity of the image processing system hardware and to the time required to image, digitize and process one two dimensional "frame" of image data. Inasmuch as it is generally undesirable to provide the image processing system separate from the mobile robot platform, the image processing system should be amenable to being carried by the moving platform and being powered by the power system of the mobile robot; the power system typically relying on batteries. Furthermore, if the time required to process each frame of pixel data, each frame comprising, for example, a two dimensional array of $256 \times 256$ pixels, is as long as several seconds the continuous motion of the robot through the environment is made difficult or impossible to achieve.

It has also been known to provide fixed guidance reference points, or "beacons", within the robot's environment, such as electrical wires embedded in the floor or infrared sources disposed along the path of the robot. Such active beacons are generally undesirable in that they introduce additional cost and complexity to the system and in general constrain the motion of the robot to a predefined path. In some systems the beacons may be combined with the aforementioned acoustic system or other proximity detection systems, the proximity detection system being provided to detect obstacles along the predefined path. The detection of an obstacle in the path of the robot may require that the robot stop until the obstacle is removed which, in some applications, may be undesirable for a number of reasons.

In accordance with the method and apparatus of the invention, a simplification of vision and vision processing is provided for a mobile robot, the robot preferably moving on a substantially planar surface, such as a floor of a building or a graded or a paved outdoor surface. That is, for a surface which is substantially two dimensional the invention provides a vision system whose field of view is substantially parallel to the surface and which generates a one dimensional image. Processing the one dimensional image provides data sufficient for navigation by the mobile robot on the two dimensional surface.

It is thus one object of the invention to provide a vision system for a mobile robot which requires a minimum of image processing system complexity while yet having an image resolution which is sufficient for guiding the robot through an environment.

It is a further object of the invention to provide a vision system for a mobile robot which does not require active beacons or other environmental modification means to be disposed within the robot's environment.

It is a still further object of the invention to provide a vision system for a mobile robot which does not process two dimensional image data but which, instead, processes a less complex one dimensional visual image of an environment, thereby deriving data for navigation upon a substantially planar surface.

It is thus one still further object of the invention to provide a vision system for a mobile robot which operates in a high speed manner and which permits the continuous, adaptive motion of the robot through the robot's environment.

SUMMARY OF THE INVENTION

The foregoing problems are overcome and the above stated objects are met by a vision system for a vehicle, such as a mobile robot, which comprises, in accordance with the invention, an optical sensor subsystem which generates a one dimensional image of an environment, a signal processing subsystem for enhancing significant visual features from the one dimensional image and a feature processing system which analyzes rapidly and in real time the enhanced features. The optical sensor may comprise a linear array of radiation detectors or a scanned radiation detector which operates to collapse and integrate the field of view in the vertical dimension while substantially eliminating horizontal features from the view. The optical sensor is preferably provided with a cylindrical lens the effect of which is to vertically integrate radiation from the field of view. The output of the optical sensor system is filtered and features associated with objects are enhanced by the signal processor. The signal processor in a preferred embodiment of the invention comprises an A/D convertor and a median-like filter; that is, a non-linear filter which suppresses noise while enhancing significant trend changes. The output of the signal processor s a list of features associated with objects within the environment. This list of features is presented to the feature processing system. The feature processing system may derive azimuth and/or positional information related to the object(s) by a number of disclosed methods. These method include triangulation, optical flow and optical flow with log transforms. The invention also encompasses binocular vision systems which generate two, one-dimensional images of the environment.

BRIEF DESCRIPTION OF THE DRAWING

The foregoing and other aspects of the invention will be made more apparent in the ensuing Detailed Description of the Invention read in conjunction with the accompanying Drawing wherein:

FIG. 3 is a system block diagram of a mobile robot constructed in accordance with the invention;

FIG. 4 is a block diagram of a robot drive system;

DETAILED DESCRIPTION OF THE INVENTION

Figure 1A:
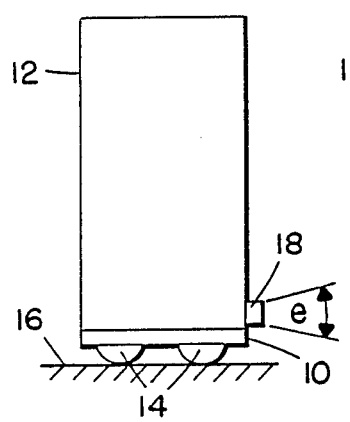
FIG. 1 is a block diagram showing three views of a mobile robot having a one dimensional visual system which is an embodiment of the invention.
Figure 1B:
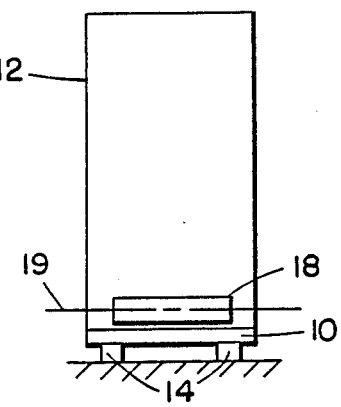
Figure 1C:
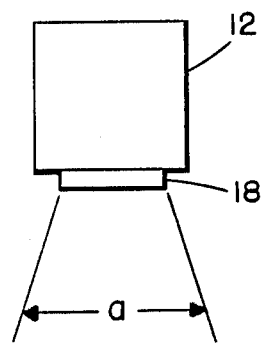

Referring now to FIG. 1a, FIG. 1b and FIG. 1c there is shown a side, front and top view, respectively, of an illustrative vehicle, such as a robot system 1. System 1 is comprised of a platform 10 upon which are mounted a housing 12 and drive means, such as wheels 14, which ride upon a surface such as a floor 16. An optical sensor 18 is disposed at a lower portion of the system 1 at a height of, for example, 3 inches from the floor 16. Preferably, sensor 18 has a field of view which is relatively narrow in elevation (e) and wide in azimuth (a). For example, the field of view of the sensor 18 may be three degrees in elevation and 100 degrees in azimuth. As can be seen, the frontal cross-section of the sensor 18 may have a narrow rectangular shape having a major axis 19 disposed substantially parallel with the floor 14.

Figure 2A:
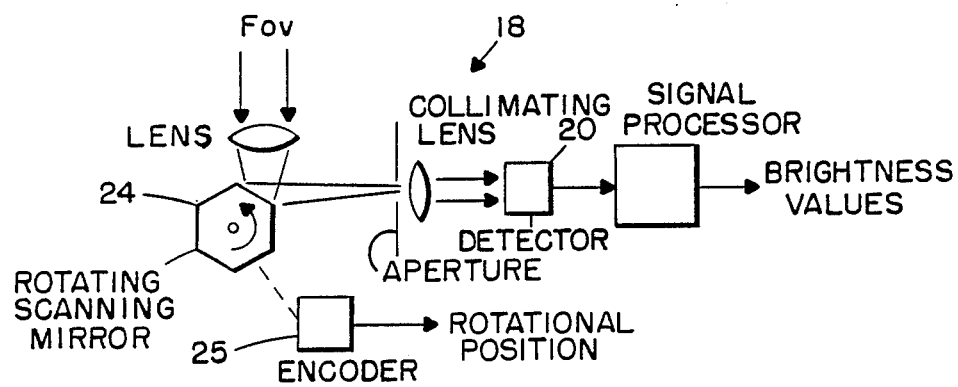
FIG. 2a is a block diagram showing a rotating scanning mirror optical sensor which is one embodiment of the invention.
Figure 2B:
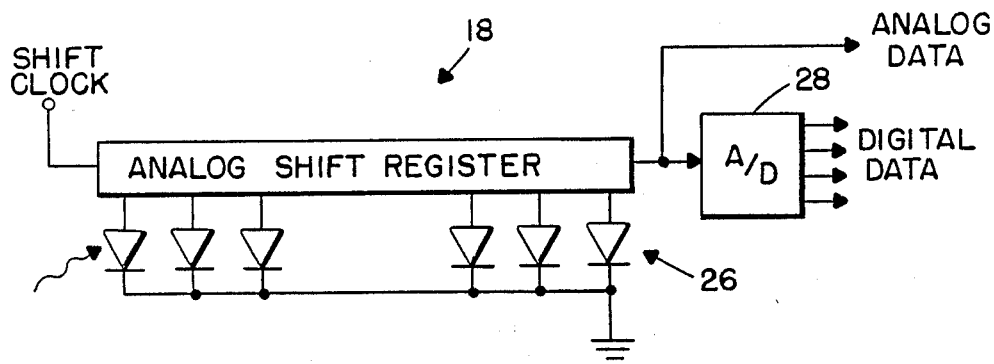
FIG. 2b is a block diagram showing a linear array of radiation detectors which is another embodiment of the optical apparatus of the invention.

In general, the sensor 18 may be any suitable sensor which is operable for sensing incident visible or infrared electromagnetic radiation for converting the radiation to an analog or a digital signal. For example, and as shown in FIG. 2a, the optical sensor may be comprised of single radiation detector 20 disposed to receive radiation emanating from a scanning mechanism such as a rotating or an oscillating mirror 24. Preferably, and as shown in FIG. 2b, the optical subsystem is comprised of a linear array detector 26 which receives an image of radiation from the robots' environment. The received radiation is converted within the camera to an analog electrical signal which may be subsequently digitized by an analog to digital convertor means 28.

As an example, the sensor 18 may be a model LC0310 line scan camera manufactured by EG & G Reticon of Sunnyvale, Calif. This particular camera is comprised of a linear photodiode array which may have a resolution of from 128 to 1024 pixels. An output electrical signal has an amplitude proportional to the light intensity incident upon a photodiode integrated over an exposure time. The photodiodes are responsive to radiation from the near portion of the ultraviolet to the near infrared spectrum. Pixels of the photodiode array are disposed in a single straight line having center-to-center spacing of approximately 25 microns; the width, or aperture, of the line of pixels also being approximately 25 microns. The camera is thus sufficiently small and compact to be efficient in mobile applications. This particular camera has an analog output and may also have a digital output which has a logical one value when the value of the video signal exceeds a predefined threshold and a logic zero value when the value of the video signal is less than the predefined threshold.

Referring now to FIG. 3 there is shown in block diagram form various systems and subsystems of the mobile robot 10. In general the robot 1 is controlled by a robot supervisory control system 30 which typically comprises a microprocessor. One function of control system 30 is to coordinate the activity of the controllable components such as motor drives and to interpret data generated by sensors. Such sensors may be visual, acoustic and/or odometric. Coupled to control system 30 is a drive system 32 which, as can be seen in FIG. 4, may be comprised of pulse width modulated (PWM) servo controllers 34a and 34b having outputs coupled through power amplifiers 36a and 36b to drive motors 38a and 38b. Rotation of the motors 38 is detected by encoders 40a and 40b and is fed back to controllers 34. The encoder output data is also, preferably, provided to the supervisory control system 30 of FIG. 3, this encoder data being expressive of the distance travelled by the robot.

Suitable PWM servo controllers 34 are manufactured by Hewlett-Packard and are known as HCTL 1000 Servo controllers; this controller having a 20 KHz PWM output. A suitable power amplifier 36 is manufactured by Motorola, Incorporated and is known as a Sensefet H Bridge Power Amplifier.

Returning now to FIG. 3 further subsystems of the robot 1 will now be described.

A. OPTICAL SENSOR SUBSYSTEM 50

An optical subsystem 50, which may comprise the aforedescribed LC0310 line scan camera, has an optical input for receiving incident visible or infrared radiation, as indicated by the arrow A, focused onto a linear array from a substantially planar field of view (FOV) 52, which is substantially parallel to the plane of motion of the robot. The optical sensor may be provided with a cylindrical lens 54 whose major axis is aligned with that of the sensor array, the lens 54 functioning to optically integrate the vertical field of view, thereby enhancing the signal-to-noise ratio of vertical features. The lens 54 further serves to deemphasize horizontal features. Lens 54 is preferably placed in front of the normal imaging lens of the line scan camera.

The optical sensor subsystem 50 is preferably operated at a rate which is rapid enough to provide data for real time control of the mobile robot. In a preferred embodiment of the invention the optical sensor subsystem 50 linearly scans the FOV 52 at approximately 100 scans per second. This scanning rate corresponds to a horizontal movement of the robot, per scan, of approximately one centimeter at a robot velocity of approximately one meter per second. The scanning process yields an analog signal whose amplitude at a particular instant in time corresponds to the brightness of the image at a particular azimuth value relative to the optical sensor.

Although the invention does not rely upon external illumination of the environment such illumination may be desirable in some environments to enhance the contrast of features which are relatively close to the robot. This external illumination may be provided by a light source 56, such as a flood light or a strobe light, which may be mounted on the front of the robot. The illumination may also be collimated to improve the contrast between the features and the background. In certain applications, such as in visually complex environments, the optical system scanning rate may be reduced and a modulated light source 56 may be employed in conjunction with phase detection to improve the noise immunity of the vision system.

In the preferred embodiment of the invention the electrical signal output of the optical subsystem 50 corresponds to a plurality of brightness values each of which relates to the intensity of the incident radiation on the linear sensor array. However, the output of the optical system in other embodiments may relate to such visual characteristics as color or polarization.

B. SIGNAL PROCESSOR SUBSYSTEM 60

The electrical output signal from the optical subsystem 50 is provided to a signal processor subsystem 60 which detects visual features associated with vertical features of interest. In general, the one dimensional image signal corresponds to an azimuth view of the environment. In the aforedescribed rotating scanner optical system of FIG. 2a the azimuth position of a feature may be directly correlated with the occurrence of a particular brightness signal by a rotation angle encoding means 25 coupled to the rotating reflector 24. In the preferred embodiment, pixel position within the linear array is linearly correlated with the tangent of the azimuth angle as will be described in detail below. The one dimensional image signal, representing brightness values, is processed through analog or digital filters to detect visual features corresponding to vertical features in the environment, such as support legs, corners of cabinets or partitions, or other vertical features of interest. Such features are generally characterized by sharp discontinuities in the image signal. In analog form the discontinuities may be detected by circuits such as comparators while in digital form the discontinuities may be detected using, for example, a digital signal processing device or a suitably programmed general purpose microprocessor. A variety of feature detection techniques may be employed to detect such discontinuities. Among these techniques are peak detection, thresholding, nearest neighbor differencing, bandpass filtering, median filtering and mathematical morphology. In accordance with a preferred embodiment of the invention signal processor subsystem 60 employs a nonlinear filter which functions to reject noise while enhancing significant changes in the one dimensional image. One such suitable filter is a median filter. Filtering may be effected directly on the analog signal from the optical subsystem, or on a digitized version of the signal. Of the feature detecting techniques mentioned above, median filtering and mathematical morphology are effected on a digital signal. Hence, an analog-to-digital conversion of the image signal within the signal processor would typically be performed in these cases. The other techniques described may be carried out by either analog or digital techniques.

In one embodiment of the signal processing system filter parameters such as window size, frequency bandpass, and selection of filter type may be predetermined and fixed. In another embodiment, having greater capabilities, these parameters may be programmable under the control of the feature processor, whose description immediately follows. This control path is indicated by the dotted arrow connecting the feature processor 68 to the signal processor 60. One purpose of this control path is to adaptively tune selected filters to enhance their sensitivity to a particular type of image feature of interest, for example a doorway.

The outputs of the filters or filter are converted to feature related data by applying criteria such as amplitude threshold or other signal related criteria which may be implemented in hardware or software. The resulting features are preferably thereafter converted to a digitized list of feature data, to be output to the feature processor subsystem 68. Each feature data item comprises image position data and possibly parameter data such as feature amplitude, characteristics, or an identification of the type of filter which yielded the feature. For the rotating mirror embodiment shown in FIG. 2a, image position of the feature is derived from the position of encoder 25 at the time the feature is detected. For the line scan camera embodiment as illustrated in FIG. 2b, the image position of the feature may be derived from the elapsed time from the beginning of the pixel scan.

For the line scan camera embodiment of FIG. 2b feature related pixel position may have an optional feature descriptor data field associated therewith for conveying information such as amplitude, gray scale value, color, etc. The optional feature descriptor data field may be useful in discriminating between features between successive scans, especially in a field of view which is cluttered with a number of features. The output of the signal processor subsystem 60 is thus expressive of feature related data which is thereafter provided to a feature processor subsystem 68.

C. FEATURE PROCESSOR SUBSYSTEM 68

The feature processor subsystem 68 of the invention selects and processes incoming feature data from the signal processor 60 to provide data relevant for navigation.

In one embodiment, the feature processor 68 output data is expressive of the heading direction of an observed feature or features with respect to the field of view. That is, if the feature processor 68 finds a pattern of features which fits a criteria for a doorway, the position of the center of this pattern, which may for example correspond to the mid-point between two widely separated intensity steps in the image, is converted to an orientation value or heading which is sent to the supervisory control system. The supervisory control system may then issue commands to the motors which steer the robot in a direction which corresponds to this heading. In this embodiment no range computation is provided nor needed, and the result is sufficient for navigation through the doorway. Similarly, the heading of a beacon may be derived, or the heading of an obstacle which is to be avoided may be derived. In each of these exemplary viewed objects, the feature pattern is different, and the feature processor interprets this differinq feature data into data usable for navigation.

In a more complex embodiment, with greater functionality, the feature processor is provided with a memory 69 to store feature history and also possibly information about the robot path distance and/or curvature, the information being provided by the supervisory computer. The supervisory computer may derive this information from encoder counts or from the input of other sensors.

The feature processor 68 relates the relative positions of the mobile robot 1 to the time and position at which the features were observed. Robot position information may be derived from the input encoder data, or may be derived from distance travelled, or velocity and time markers. Whichever form of positional information is provided to the feature processor 68 by the supervisory control system 30, the feature processing subsystem 68 associates the position of the robot at successive times with feature sightings. It is one important aspect of the invention that these two kinds of information are combined in a simple way in the feature processing subsystem 68 to yield information about the geometric position of the objects corresponding to features, relative to the robot, thereby relieving the supervisory control system of this burden.

Figure 5:
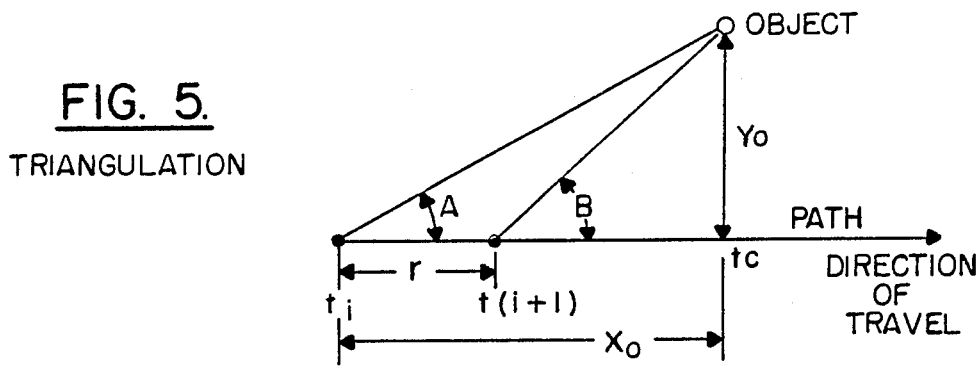
FIGS. 5–7 illustrate in graphical form three feature processing methods of the invention; namely triangulation, optical flow and optical flow with log transforms, respectively.

In accordance with one embodiment of a method of the invention, shown in FIG. 5, triangulation processing is performed to extract the two dimensional position of the detected feature in floor world coordinates as referenced to the robot. Using symbolic feature representation at times t(i) and t(i+1), triangulation provides the x and y floor world coordinates of the feature in terms of the azimuth angles A and B in accordance with the expressions:

$$x = \frac{r^*\tan B}{\tan(B) - \tan(A)} \quad (1)$$

and $$y = x^*\tan(A) = \frac{r^*(\tan(A)\tan(B))}{\tan(B) - \tan(A)} \quad (2)$$

where $$r = v^*t \quad (3)$$

and "*" denotes multiplication.

Figure 6:
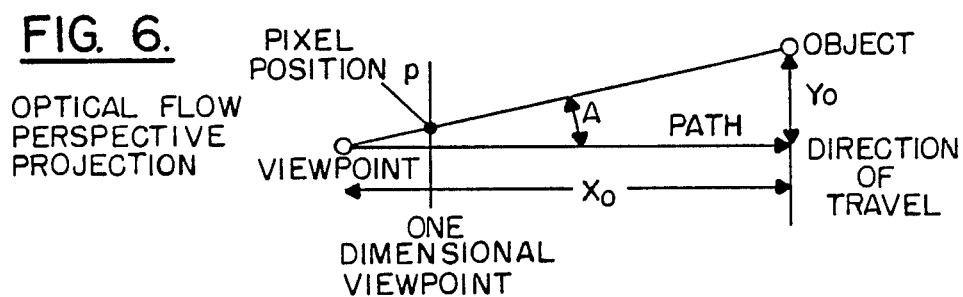
Figure 7:
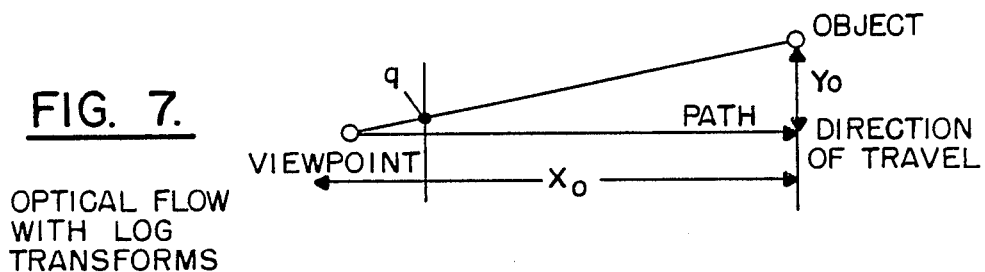

In accordance with preferred embodiments of the invention feature processing is accomplished by optical flow or optical flow with log transforms as shown in FIGS. 6 and 7, respectively. These feature processing methods are described below.

In the optical flow method of FIG. 6 "p" designates a pixel position relative to a reference position, such as the center of view, in perspective projection of a feature onto a 1-dimensional image. Preferably the reference position coincides with the path, or direction of travel, of the robot.

By scaling units suitably, p can be treated as the tangent of angle A of subtense of the object corresponding to the feature. The values of x and y are generally unknown a priori, and are deduced within the feature processor as follows.

The forward velocity "v" is known to the feature processor subsystem 62 by communication from the supervisory control system 30, such that $$x = x0 - (v^*t), \quad (4)$$

where x0 is the (unknown) distance from viewplane to object at time 0. Perspective projection onto the viewplane yields $$p = y/x = y/(x0 - v^*t). \quad (5)$$

The optical flow, or time derivative, of p is thus $$dp/dt = y^*v/(x0 - v^*t)^2 = p^*v/x0 - vt. \quad (6)$$

Solving for x0 and y, since dp/dt and v are known, yields, at t=0, $$x0 = v^*p/(dp/dt) \quad (7)$$

and $$y = v^*p^2/(dp/dt). \quad (8)$$

In accordance with the optical flow with log transforms method of FIG. 7 it is considered that pixel coordinates are logarithmic, namely $$q = \ln(p) \quad (9)$$

where "ln" designates natural logarithms, i.e. to the base e=2.71828 . . .

The perspective image of a point is given by $$q = \ln(y) - \ln(x0 - v^*t) \quad (10)$$

or $$q = \ln(y) - \ln(v) - \ln(xo/v - t). \quad (11)$$

Inasmuch as y and v are constants, $$dq/dt = 1/(x0/v - t) \quad (12)$$

Substituting t=0 yields $$x0 = v/(dq/dt) \quad (13)$$

and $$y = (v*\exp(q))/(dq/dt) \quad (14)$$

It can be seen that the computation for x0 is relatively simpler when logarithmic coordinates are utilized.

In summary, the feature processing subsystem 68 uses historical information regarding feature sightings and robot travel distance to deduce geometric positions of objects within the environment. It does so by utilizing relatively simple equations which may be executed in real time using a conventional 8 or 16 bit microprocessor. These relatively simple processing requirements are minimal compared to the substantially more complex processing requirements of conventional two dimension vision systems. In accordance with the invention, a conventional 16 bit microprocessor having only a few kilobytes of memory may yield useful navigation data within less than one second whereas conventional two dimensional systems might require many seconds using a minicomputer having several hundred kilobytes of memory.

As has been stated, feature related azimuth and x and y positional information is provided to control system 30 for subsequent processing. This subsequent processing may, for example, involve the comparison of the received data to a stored world map for generating navigation-related control signals to drive system 32. Alternatively, the positions of objects deduced by the invention, as described above, may be stored and used for vehicle or robot path planning.

Figure 8A:
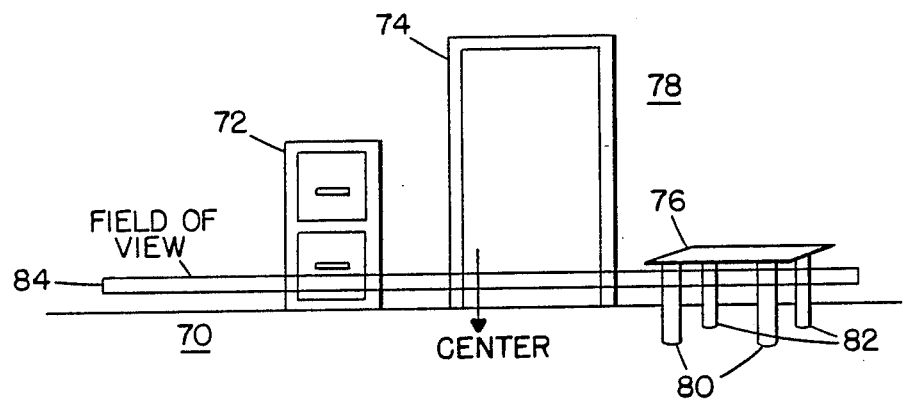
FIGS. 8a–8e illustrate a typical environment and perceptions of the environment as viewed by a mobile vehicle having an embodiment of the invention.

In order to gain a better appreciation of the apparatus and method of the invention reference is now made to FIGS. 8a-8e. In FIG. 8a there is shown a representative environment which may be viewed by a robot having an embodiment of the invention. This environment includes a floor 70 upon which the robot moves and which defines a floor world coordinate reference system. The environment also includes a filing cabinet 72, a door opening 74 and a table 76 having four legs. The table is disposed at an angle to a wall 78 such that two of the legs 80 are skewed in relation to the rear legs 82. The linear field of view 84 of the robot is indicated by a narrow rectangle which can be seen to be substantially parallel to the floor 70.

Figure 8B:
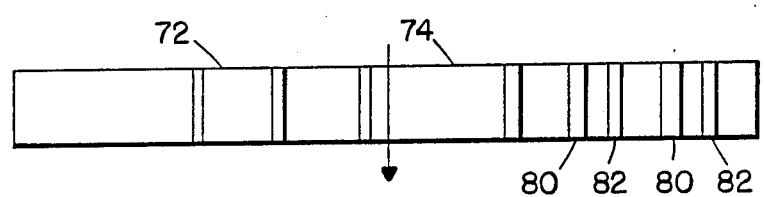

FIG. 8b shows the view of the environment of FIG. 8a as viewed by the robot wherein it can be seen that the features of the environment appear, in accordance with the invention, as vertical features which correspond to edges of the filing cabinet 72, the door opening 74 and the table legs 80 and 82. The vertical nature of the image feature corresponds to a sharp change in brightness across the image screen at that location, i.e. high contrast. For example, if the table legs were substantially darker than the wall 78 behind them, the image would show four shape depressions rather than the four prominences which are illustrated. In either case, the location of the image features would be unchanged. Due to the position of the field of view 84 relative to the plane of the floor 70 features associated with objects such as tables, chairs, work benches etc. are dominated by such vertical features. In general, these dominating features are support legs and vertical edges. As has been previously mentioned, the images of these vertical features may be enhanced by providing a cylindrical lens in front of the optical system. For example, if the field of view were high enough to encompass the handle of the drawer on the file cabinet 72 in FIG. 8a, the cylindrical lens would diminish the image of the handle by "smearing" it together with the frontal surface of the drawer.

Figure 8C:
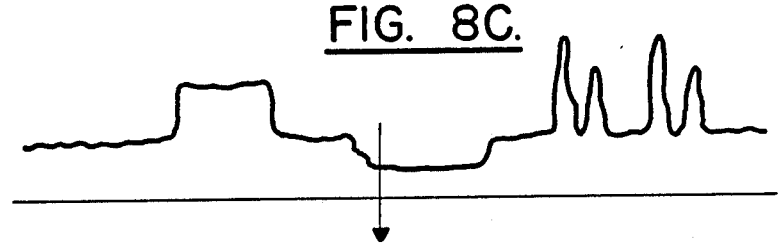

FIG. 8c shows in graphical form the output of the optical subsystem 50, that is the analog feature data, wherein it can be seen that these various vertical features have varying signal amplitudes. For example, the filing cabinet 72 may present a signal having a larger magnitude than the door opening 74. Also, the table legs 80 and 82 may appear as four unequal amplitude signal excursions which are relatively close to one another.

Figure 8D:
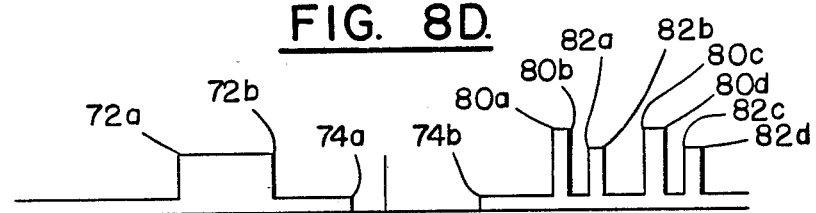

FIG. 8d shows in graphical form the signals of FIG. 8c after the signals have been processed in part by the signal processor subsystem 60 wherein it can be seen that the signals have been filtered.

The digital output of the signal processor subsystem 60 may have the following illustrative format. The heading "Reference Number" refers to the numerical labels in FIG. 8d. Also, the Feature Descriptor data field is shown expressed in hexadecimal format, although any convenient number base system may be employed.

| Reference Number | Pixel Position | Feature Descriptor |
|---|---|---|
| 72a | 250 | A5 |
| 72b | 380 | A5 |
| 74a | 500 | 10 |
| 74b | 700 | 10 |
| 80a | 825 | D0 |
| 80b | 840 | D0 |
| 82a | 852 | 95 |
| 82b | 870 | 95 |
| 80c | 920 | D0 |
| 80d | 935 | D0 |
| 82a | 950 | 95 |
| 82b | 958 | 95 |

The pixel position may be relative to one end of the linear array of pixels, for example the left end, or may be relative to a center pixel. The optional Feature Descriptor data field may, as shown above, express gray scale data or may, in other embodiments of the invention, be expressive of feature color or some other visual characteristic, such as polarization angle of the incident radiation.

Figure 8E:
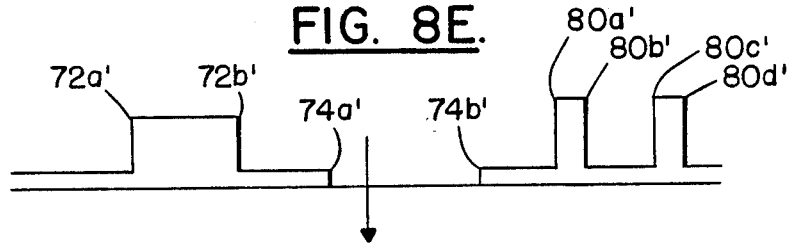

FIG. 8e shows the signals of FIG. 8d at a later point in time after the robot has moved along a straight line path towards the door opening 74. As can be seen, the result of this movement is to shift the edge-related signals (indicated by primed reference designators) away from the center reference point by some number of pixels which are a function of the distance traveled by the robot. As can also be seen, the rear table legs 82 have been occluded by the front table legs 80 such that only two signals 46 now indicate the table legs. Inasmuch as the feature processor 68 may have a memory of recent pixel position data, and also information relating to the distance travelled by the robot between the scans of FIGS. 8d and 8e, the feature processor 68 is enabled to derive the bearing (azimuth) and distance to the features in accordance with the method or methods described above in equations 1–14.

If the reference world view maintained by the control system 30 is a learned world view, that is, if the world view was generated by a movement of the robot during a learning phase of operation wherein feature data was extracted from the environment and stored for later use, the occlusion of the table legs 82 may be predicted by the supervisory control system 30. This assumes, of course, that the robot is following substantially the same course as it followed during the learning phase and also that the position of the table has not changed. If the legs 82 are not occluded as expected it may be assumed that the robot is off course and suitable motor command correction signals can be generated by the control subsystem 30 for input to the drive system 32. The derivation of such an assumption relies in part on the azimuth angles to other features in the environment, such as the cabinet 72 and door opening 74. If the azimuth angles to these features deviate from the reference then an assumption that the robot is off course is reinforced. If the azimuth angles to these other features do not deviate by more than some predetermined amount, an assumption that the relative position of the table has changed is reinforced and no drive correction signals may be generated.

In either case it can be appreciated that the one dimensional visual system of the invention provides for a reduction in both the amount and complexity of feature processing computation. Conventional two-dimensional vision systems would be required to digitize and process essentially the entire view of the environment as shown in FIG. 8a in order to detect the deviation of objects from a world reference. It can be appreciated that the shape of three dimensional objects is more complex, and the transitions of the images under perspective projection are also more complex than the vertical features detected and processed by the invention. Thus, conventional vision systems would be required to have much faster and more complex on-board computational hardware than the system of the invention in order to process the image data at equal scan rates. As previously mentioned, such conventional systems must often rely on offboard computers which, for many mobile robot applications, is totally inappropriate.

Figure 9:
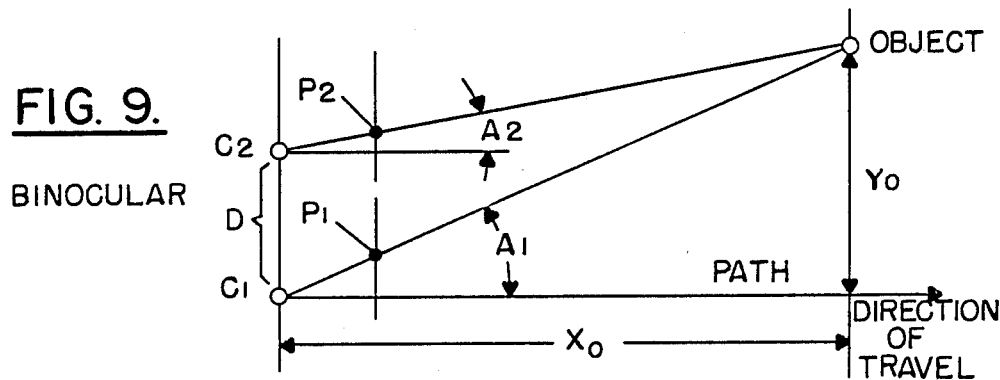
FIG. 9 illustrates in graphical form a binocular one dimensional image system and a method of using same.

The invention also encompasses other method and apparatus in which two one-dimensional images are used for binocular stereo position measurement of an object in the environment. That is, a single object in the environment is projected onto two optical sensors. The signal processor 60 filters the features from each sensor. From the positions of features in each image, the feature processor 68 computes the position of the object. FIG. 9 illustrates such a binocular configuration. The two images are parallel and aligned along the same line parallel to the field of the view plane. For notational convenience, consider the viewpoint C1 of the first image to lie at the (x, y) coordinate origin (0,0), and the second viewpoint C2 to lie D units along the y-axis of coordinates, namely at (O,D). Let p1 and p2 represent the image plane coordinates of the feature associated with an object located at (x0, y0), projected onto the two images as shown. Then, $$p1 = y0/x0 \qquad (15)$$

and $$p2 = (y0 - D)/x0. \qquad (16)$$

Solving for y0, $$y0 = x0*p1 = D + x0*p2 \qquad (17)$$

whence, $$x0 = D/(p1-p2) \qquad (18)$$

and $$y0 = D*p1/(p1-p2). \quad (19)$$

Thus, the feature processor 68 computes the two dimensional position of the object at (x0, y0), given the separation of viewpoints D and the pixel positions p1 and p2 of the feature in the two images.

A means for providing two separate images may comprise two separate optical sensor systems, or a single system with a movable mirror in front, or a single system mounted on a movable slide which travels the distance D between successive taking of images. Similarly, signal processing may be accomplished by duplicating the hardware or by sharing the signal processing hardware between the two images in a time multiplexed scheme.

Preferred embodiments of the invention have herein been described and it is anticipated that those having skill in the art may derive modifications to these preferred embodiments. For example, although one aspect of the invention has been described in the context of a linear array photodetector it should be realized that a two dimensional array photodetector may be employed having m rows and n columns, with the m photodetectors within each of the n columns being averaged or otherwise combined to yield a single output from each column. Such an operation would vertically integrate the image in a manner similar to that of the aforementioned cylindrical lens, but would have an additional advantage that the imaging operation may be adaptively programmed to select alternative fields of view and/or alternative lens parameters. Thus, the invention is not intended to be limited to only the preferred embodiments disclosed above, the invention is instead to be limited only as defined by the appended claims.

What is claimed is:

1. A vision system for a mobile vehicle comprising:
   means, having a substantially planar field of view of an environment, for generating a substantially linear, one-dimensional image of the environment through which a mobile vehicle moves, the environment including at least one object, said image generating means having an output signal for expressing a characteristic of the image at a plurality of points along the substantially one dimensional image; and
   means, coupled to said output signal, for processing said output signal to determine at least one characteristic associated with a position of the object relative to a position of said mobile vehicle within the environment.

2. A vision system as defined in claim 1 wherein said at least one determined characteristic is an azimuth angle between said mobile vehicle and the object.

3. A vision system as defined in claim 1 wherein said at least one determined characteristic includes a distance to the object relative to the vehicle.

4. A vision system as defined in claim 1 and further comprising:
  means, coupled to said processing means, for varying the position of said mobile vehicle relative to the object as a function of said at least one determined characteristic.

5. A vision system as defined in claim 4 wherein said mobile vehicle moves across a substantially planar surface and wherein said field of view is substantially parallel with the surface.

6. A vision system as set forth in claim 1 and further comprising means, coupled to the vehicle, for illuminating the environment.

7. A vision system as set forth in claim 1 wherein said means for generating comprises a linear array of radiation detectors that view the environment through a cylindrical lens.

8. A vision system as set forth in claim 1 wherein said means for generating comprises a two-dimensional array of radiation detectors having detector outputs from a given row or column combined such that a substantially one-dimensional image is obtained.

9. A vision system for a vehicle comprising:
  optical sensor means for generating a substantially linear, one dimensional image of an environment through which the vehicle is to move, the environment including one or more features, said sensor means having a first output signal expressive of edge boundaries of the one or features appearing within the substantially one dimensional image;
  signal processing means coupled to said first output signal for processing said signal for detecting the edge boundaries associated with the one or more features, said signal processing means having a second output signal expressive at least of the detected edge boundaries; and
  feature processing means coupled to said second output signal for generating a third output signal expressive at least of a positional relationship between said vehicle and the one or more features within the field of view.

10. A vision system as defined in claim 9 wherein said optical sensor means comprises:
  a radiation detector; and
  means for sequentially activating the radiation detector for generating a plurality of output signals, each of the output signals being expressive of the detected radiation at a point along said substantially linear, one-dimensional image.

11. A vision system as defined in claim 10 wherein said substantially one-dimensional image is orientated substantially parallel to the surface.

12. A vision system as defined in claim 11 wherein said radiation detector comprises an array of visible radiation detectors.

13. A vision system as defined in claim 11 wherein said radiation detector comprises an array of infrared radiation detectors.

14. A vision system as defined in claim 9 wherein the first output signal is expressive of brightness values along the substantially one dimensional image.

15. A vision system as defined in claim 9 wherein the first output signal is expressive of color values along the substantially one dimensional image.

16. A vision system as defined in claim 9 wherein the first output signal is expressive of a polarization angle of radiation along the one dimensional image.

17. A vision system as defined in claim 9 wherein said positional relationship is an azimuth angle between said vehicle and at least one of said one or more features.

18. A vision system as defined in claim 9 wherein said positional relationship is a distance between said vehicle and at least one of said one or more features.

19. A vision system as defined in claim 9 wherein said vehicle comprises:
  drive means for moving said vehicle across a surface; and
  control means for controlling the operation of said drive means, said control means being coupled to said third output signal and responsive thereto for controlling the operation of said drive means at least in response to said positional relationship between said vehicle and the one or more features within the substantially one-dimensional image.

20. A vision system as defined in claim 19 wherein said vehicle further comprises:
  encoder means, coupled to said drive means and responsive to the operation thereof, for outputting to said control means a signal expressive of a distance travelled by said vehicle between a first and a second point on the surface; and
  means, coupled to said encoder means output signal, for outputting to said feature processing means a signal expressive of a velocity of said vehicle between the first and the second point.

21. A mobile robot comprising:
  platform means;
  drive means coupled to said platform means for moving said platform means relative to a surface;
  control means, coupled to said platform means, for providing control signals to said drive means for controlling the movement of said platform means; and
  vision means, coupled to said platform means, for generating vision signals related to one or more features within an environment through which said platform means moves, said vision means comprising:
  optical sensor means for generating a substantially linear, one dimensional image of an environment through which the robot moves, the environment including one or more features, said sensor means having a first output signal expressive of edge boundaries of the one or features appearing within the substantially one dimensional image;
  signal processing means coupled to said first output signal for processing said signal for detecting the edge boundaries associated with the one or more features, said signal processing means having a second output signal expressive at least of the detected edge boundaries; and
  feature processing means coupled to said second output signal for generating a third output signal expressive at least of a positional relationship between the robot and the one or more features within the field of view.

22. A mobile robot as defined in claim 21 wherein said optical sensor means comprises:
  a radiation detector; and
  means for sequentially activating the radiation detector for generating a plurality of output signals, each of the output signals being expressive of the detected radiation at a point along said substantially linear, one-dimensional image.

23. A mobile robot as defined in claim 22 wherein said substantially one-dimensional image is orientated substantially parallel to a surface over which the robot moves.

24. A mobile robot as defined in claim 23 wherein said optical sensor means comprises an array of radiation detectors.

25. A mobile robot as defined in claim 21 and further comprising:
- encoder means, coupled to said drive means and responsive to the operation thereof, for outputting to said control means a signal expressive of a distance travelled by said robot between a first and a second point on the surface; and
- means, coupled to said encoder means output signal, for outputting to said feature processing means a signal expressive of a velocity of said robot between the first and the second point.

26. A mobile robot as defined in claim 21 wherein the optical sensor means further comprises a cylindrical lens disposed in front of said radiation detector for emphasizing vertical components of said features.

27. For a vehicle moving over a surface at a velocity along a path, a method of determining an x-y position of an object disposed relative to the surface where x is a distance to the object parallel to the path and y is a distance to the object perpendicular to the path, comprising the steps of:
- at a first time $t_{(i)}$ viewing the object to generate a substantially one-dimensional image of the object, the substantially one dimensional image being orientated in a substantially parallel manner with the surface;
- determining a first position of the object within the one dimensional image relative to a first position within the one-dimensional image which coincides with the path;
- converting the difference between the first image position and the first path position to a tangent of an angle (A), where A is the angle between the object and the path at time $t_{(i)}$;
- at a second time $t_{(i+1)}$ viewing the object to generate a substantially one-dimensional image of the object, the substantially one dimensional image being orientated in a substantially parallel manner with the surface;
- determining a second position of the object within the one dimensional image relative to a second position within the one-dimensional image which coincides with the path;
- converting the difference between the second image position and the second path position to a tangent of an angle (B), where B is the angle between the object and the path at time $t_{(i+1)}$; and
- calculating the distance x in accordance with the equation
$x = r*\tan(B)/(\tan(B) - \tan(A))$;
and calculating the distance y in accordance with the equation
$y = x*\tan(A)$
where $r = u*t$, where t is the difference in time between $t_{(i)}$ and $t_{(i+1)}$.

28. A binocular vision system for a vehicle comprising:
- optical sensor means for detecting radiation emanating from one or more features within an environment of a vehicle, said sensor means generating two substantially one-dimensional images of the environment, the images being substantially parallel one to another and each having an image output signal expressive of a characteristic of the detected radiation at a plurality of points along the associated substantially one dimensional image, said vehicle being disposed upon a surface and said one-dimensional images being disposed at a predetermined orientation to the surface;
- signal processing means coupled to said image output signals for processing said signals for detecting a component or components of each of said image output signals associated with said one or more features, said signal processing means having an output signal expressive at least of the detected component or components of the image output signals; and
- feature processing means coupled to said signal processing means output signal for generating an output signal expressive at least of a positional relationship between said vehicle and the one or more features within the environment of the vehicle.

29. A binocular vision system as defined in claim 28 wherein said optical sensor means comprises:
- a radiation detector; and means for sequentially activating the radiation detector for generating a plurality of output signals, each of the output signals being expressive of the radiation at a point along at least one of said substantially one-dimensional images.

30. A binocular vision system as defined in claim 28 wherein each of said substantially one-dimensional images is orientated substantially parallel to the surface.

31. A binocular vision system as defined in claim 28 wherein said optical sensor means comprises a first and a second array of radiation detectors, the first and second arrays being substantially linear arrays which are disposed parallel one to another.

32. A binocular vision system as defined in claim 28 wherein said optical sensor means comprises an array of infrared radiation detectors.

33. For a vehicle moving over a surface along a path, a method of determining an x-y position of an object disposed relative to the surface where $x_o$ is an unknown distance to the object parallel to the path and y is an unknown distance to the object perpendicular to the path, comprising the steps of:
- viewing the object from a first viewpoint and from a second viewpoint to generate two substantially one-dimensional images of the object, the substantially one dimensional images being orientated in a substantially parallel manner one to another and also with the surface;
- determining a position (p) of the object within each of the one dimensional images relative to a position within each of the one-dimensional images which coincides with the path;
- calculating the distance $x_o$ in accordance with the equation
$x_o = D/(p1 - p2)$;
and calculating the distance y in accordance with the equation
$y = D*p1/(p1 - p2)$;
where p1 and p2 are each the determined position within each of the fields of view in perspective projection of the object onto the substantially one dimensional image and wherein D is a distance between the first viewpoint and the second viewpoint.

34. For a vehicle moving over a surface at a velocity along a path, a method of determining for an object disposed relative to the surface an azimuth angle of the object relative to the path, comprising the steps of:
  at a first time $t_{(i)}$ viewing the object to generate a substantially one-dimensional image of the object, the substantially one dimensional image being orientated in a substantially parallel manner with the surface;
  determining a first position of the object within the one dimensional image relative to a first position within the one-dimensional image which coincides with the path; and
  converting the difference between the first image position and the first path position to a tangent of an angle (A), where A is the angle between the object and the path at time $t_{(i)}$.

35. For a vehicle moving over a surface at a velocity along a path, a method of determining an x-y position of an object disposed relative to the surface where $x_o$ is an unknown distance to the object parallel to the path and y is an unknown distance to the object perpendicular to the path, comprising the steps of:
  viewing the object to generate a substantially one-dimensional image of the object, the substantially one dimensional image being orientated in a substantially parallel manner with the surface; determining a position of the object within the one dimensional image relative to a position within the one-dimensional image which coincides with the path;
  determining the velocity (v) of the vehicle along the path; and
  calculating the distance $x_o$ in accordance with the equation
  $x_o = v*p/(dp/dt)$; and
  calculating the distance y in accordance with the equation
  $y = v*p /(dp/dt)$;
  where p is a position within the field of view in perspective projection of the object onto the substantially one dimensional image.

36. For a vehicle moving over a surface at a velocity along a path, a method of determining an x-y position of an object disposed relative to the surface where $x_o$ is an unknown distance to the object parallel to the path and y is an unknown distance to the object perpendicular to the path, comprising the steps of:
  viewing the object to generate a substantially one-dimensional image of the object, the substantially one dimensional image being orientated in a substantially parallel manner with the surface;
  determining a position of the object within the one dimensional image relative to a position within the one-dimensional image which coincides with the path;
  determining the velocity (v) of the vehicle along the path; and
  calculating the distance $x_o$ in accordance with the equation
  $x_o = v/(dq/dt)$; and
  calculating the distance y in accordance with the equation
  $y = (v*exp(q))/(dq/dt)$;
  where q is a natural logarithm of p and wherein p is a determined position within the field of view in perspective projection of the object onto the substantially one dimensional image.

* * * * *

UNITED STATES PATENT AND TRADEMARK OFFICE
CERTIFICATE OF CORRECTION

PATENT NO. : 4,905,151

DATED : February 27, 1990

INVENTOR(S) : Weiman et al.

It is certified that error appears in the above-identified patent and that said Letters Patent is hereby corrected as shown below:

IN THE CLAIMS:

Claim 35, Col. 18, line 6 the equation $y=v*p/(dp/dt)$ should read $y=v*p^2/(dp/dt)$ Signed and Sealed this Eighth Day of January, 1991

Attest:

HARRY F. MANBECK, JR.

*Attesting Officer*  *Commissioner of Patents and Trademarks*